(12) United States Patent
Hartog et al.

(10) Patent No.: US 10,242,420 B2
(45) Date of Patent: *Mar. 26, 2019

(54) PREEMPTIVE CONTEXT SWITCHING OF PROCESSES ON AN ACCELERATED PROCESSING DEVICE (APD) BASED ON TIME QUANTA

(71) Applicant: Advanced Micro Devices, Inc., Sunnyvale, CA (US)

(72) Inventors: Robert Scott Hartog, Windemere, FL (US); Ralph Clayton Taylor, Deland, FL (US); Michael Mantor, Orlando, FL (US); Kevin John McGrath, Los Gatos, CA (US); Sebastien Nussbaum, Boxborough, MA (US); Nuwan Jayasena, Sunnyvale, CA (US); Rex McCrary, Orlando, FL (US); Mark Leather, Los Gatos, CA (US); Philip J. Rogers, Austin, TX (US); Thomas Woller, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/362,230

(22) Filed: Nov. 28, 2016

(65) Prior Publication Data

US 2017/0076421 A1    Mar. 16, 2017

Related U.S. Application Data

(63) Continuation of application No. 13/289,809, filed on Nov. 4, 2011, now Pat. No. 9,507,632.

(60) Provisional application No. 61/423,488, filed on Dec. 15, 2010.

(51) Int. Cl.
| | |
|---|---|
| G06T 1/20 | (2006.01) |
| G06F 9/48 | (2006.01) |
| G06F 9/52 | (2006.01) |
| G06T 1/60 | (2006.01) |

(52) U.S. Cl.
CPC ............. *G06T 1/20* (2013.01); *G06F 9/4881* (2013.01); *G06F 9/526* (2013.01); *G06T 1/60* (2013.01)

(58) Field of Classification Search
CPC ............ G06T 1/20; G06T 1/60; G06F 9/4881
USPC .................................. 345/501; 718/102, 108
See application file for complete search history.

(56) References Cited

U.S. PATENT DOCUMENTS

| 7,234,144 B2 | 6/2007 | Wilt et al. |
| 2005/0246461 A1 * | 11/2005 | Accapadi ............. G06F 9/4812 710/200 |
| 2007/0103476 A1 * | 5/2007 | Huang ................. G06T 15/005 345/522 |
| 2008/0052716 A1 | 2/2008 | Theurer |
| 2009/0160867 A1 | 6/2009 | Grossman |

(Continued)

*Primary Examiner* — Jacinta M Crawford
(74) *Attorney, Agent, or Firm* — Volpe and Koenig, P.C.

(57) ABSTRACT

Methods and apparatus are described. A method includes an accelerated processing device running a process. When a maximum time interval during which the process is permitted to run expires before the process completes, the accelerated processing device receives an operating-system-initiated instruction to stop running the process. The accelerated processing device stops the process from running in response to the received operating-system-initiated instruction.

17 Claims, 6 Drawing Sheets

(56) References Cited

U.S. PATENT DOCUMENTS

2011/0099551 A1    4/2011   Fahrig et al.

* cited by examiner

PREEMPTIVE CONTEXT SWITCHING OF PROCESSES ON AN ACCELERATED PROCESSING DEVICE (APD) BASED ON TIME QUANTA

CROSS REFERENCE TO RELATED APPLICATION(S)

This application is a continuation of U.S. patent application Ser. No. 13/289,809 filed Nov. 4, 2011, which claims the benefit of U.S. provisional application No. 61/423,488, filed on Dec. 15, 2010, which is hereby incorporated by reference in its entirety.

BACKGROUND

Field of the Invention

The present invention is generally directed to computer systems. More particularly, the present invention is directed to context-switching.

Background Art

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market (e.g., notebooks, mobile smart phones, tablets, etc.) and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available primarily for the acceleration of graphics. These constraints arose from the fact that GPUs did not have as rich a programming ecosystem as CPUs. Their use, therefore, has been mostly limited to two dimensional (2D) and three dimensional (3D) graphics and a few leading edge multimedia applications, which are already accustomed to dealing with graphics and video application programming interfaces (APIs).

With the advent of multi-vendor supported OpenCL® and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of a CPU and a GPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) separate memory systems, (ii) efficient scheduling, (iii) providing quality of service (QoS) guarantees between processes, (iv) programming model, and (v) compiling to multiple target instruction set architectures (ISAs)—all while minimizing power consumption.

For example, the discrete chip arrangement forces system and software architects to utilize chip to chip interfaces for each processor to access memory. While these external interfaces (e.g., chip to chip) negatively affect memory latency and power consumption for cooperating heterogeneous processors, the separate memory systems (i.e., separate address spaces) and driver managed shared memory create overhead that becomes unacceptable for fine grain offload.

Both the discrete and single chip arrangements can limit the types of commands that can be sent to the GPU for execution. This performance based limitation exists because the CPU may relatively quickly require the results of the operations performed by these computational commands. However, because of the high overhead of dispatching work to the GPU in current systems and the fact that these commands may have to wait in line for other previously-issued commands to be executed first, the latency incurred by sending computational commands to the GPU is often unacceptable.

For example, since processes cannot be efficiently identified and/or preempted, a rogue process can occupy the GPU for arbitrary amounts of time. The occupying of the GPU by rogue processes for arbitrary amounts of time can prevent the effective utilization of the available system capacity, and can prevent or significantly reduce the processing progress of the system. In other cases, the ability to context switch off the hardware is severely constrained—occurring at very coarse granularity and only at a very limited set of points in a program's execution.

SUMMARY OF EMBODIMENTS

What is needed, therefore, are methods and systems for efficiently preempting processes, such as rogue processes, from a GPU and context switching another process onto the GPU.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner with respect to resources such as conventional CPUs, conventional GPUs, and/or combinations thereof.

An embodiment of the present invention provides a system including at least one APD configured to preempt a process running on an accelerated processing device based upon a running time of the process and a threshold time quanta.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

Figure 1A:
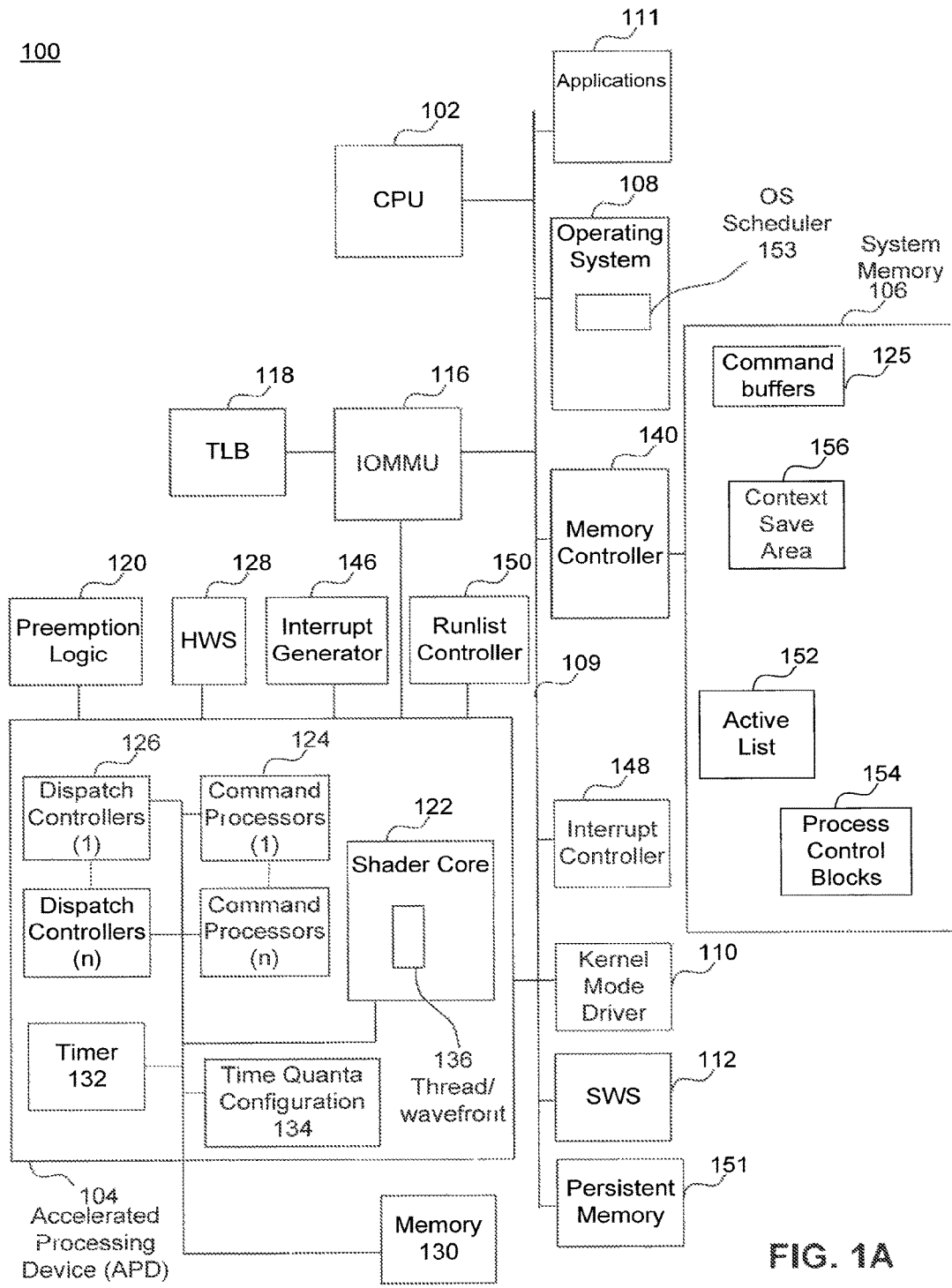
FIG. 1A is an illustrative block diagram of a processing system, in accordance with embodiments of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF EMBODIMENTS OF THE INVENTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

FIG. 1A is an exemplary illustration of a unified computing system 100 including two processors, a CPU 102 and an APD 104. CPU 102 can include one or more single or multi core CPUs. In one embodiment of the present invention, the system 100 is formed on a single silicon die or package, combining CPU 102 and APD 104 to provide a unified programming and execution environment. This environment enables the APD 104 to be used as fluidly as the CPU 102 for some programming tasks. However, it is not an absolute requirement of this invention that the CPU 102 and APD 104 be formed on a single silicon die. In some embodiments, it is possible for them to be formed separately and mounted on the same or different substrates.

In one example, system 100 also includes a memory 106, an operating system 108, and a communication infrastructure 109. The operating system 108 and the communication infrastructure 109 are discussed in greater detail below.

The system 100 also includes a kernel mode drive (KMD) 110, a software scheduler (SWS) 112, and a memory management unit 116, such as input/output memory management unit (IOMMU). Components of system 100 can be implemented as hardware, firmware, software, or any combination thereof. A person of ordinary skill in the art will appreciate that system 100 may include one or more software, hardware, and firmware components in addition to, or different from, that shown in the embodiment shown in FIG. 1A.

In one example, a driver, such as KMD 110, typically communicates with a device through a computer bus or communications subsystem to which the hardware connects. When a calling program invokes a routine in the driver, the driver issues instructions to the device. Once the device sends data back to the driver, the driver may invoke routines in the original calling program. In one example, drivers are hardware-dependent and operating-system-specific. They usually provide the interrupt handling required for any necessary asynchronous time-dependent hardware interface. Device drivers, particularly on modern Microsoft Windows® platforms, can run in kernel-mode (Ring 0) or in user-mode (Ring 3).

A benefit of running a driver in user mode is improved stability, since a poorly written user mode device driver cannot crash the system by overwriting kernel memory. On the other hand, user/kernel-mode transitions usually impose a considerable performance overhead, thereby prohibiting user mode-drivers for low latency and high throughput requirements. Kernel space can be accessed by user module only through the use of system calls. End user programs like the UNIX shell or other GUI based applications are part of the user space. These applications interact with hardware through kernel supported functions.

CPU 102 can include (not shown) one or more of a control processor, field programmable gate array (FPGA), application specific integrated circuit (ASIC), or digital signal processor (DSP). CPU 102, for example, executes the control logic, including the operating system 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104.

APD 104, among other things, executes instructions and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations (e.g., those operations unrelated to graphics such as, for example, video operations, physics simulations, computational fluid dynamics, etc.), based on commands or instructions received from CPU 102.

For example, commands can be considered a special instruction that is not defined in the instruction set architecture (ISA). A command may be executed by a special processor such a dispatch processor, command processor, or network controller. On the other hand, instructions can be considered as, for example, a single operation of a processor within a computer architecture. In one example, when using two sets of ISAs, some instructions are used to execute x86 programs and some instructions are used to execute kernels on APD compute unit.

In an illustrative embodiment, CPU 102 transmits selected commands and/or other instructions to APD 104. These selected instructions can include graphics instructions and other commands amenable to parallel execution. These selected instructions, that can also include compute processing commands, can be executed substantially independently from CPU 102.

APD 104 can include its own compute units (not shown), such as, but not limited to, one or more single instruction multiple data (SIMD) processing cores. As referred to herein, a SIMD is a pipeline, or programming model, where a kernel is executed concurrently on multiple processing elements each with its own data and a shared program counter. All processing elements execute an identical set of instructions. The use of predication enables work-items to participate or not for each issued instruction.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks such as those that are common in graphics processing.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 in order to process such data elements in parallel. As referred to herein, for example, a compute kernel is a function containing instructions declared in a program and executed on an APD compute unit. This function is also referred to as a kernel, a shader, a shader program, or a program.

In one illustrative embodiment, each compute unit (e.g., SIMD processing core) can execute a respective instantiation of a particular work-item to process incoming data. A work-item is one of a collection is of parallel executions of a kernel invoked on a device by one or more instructions. A work-item can be executed by one or more processing elements as part of a work-group executing on a compute unit.

A work-item is distinguished from other executions within the collection by its global ID and local ID. In one example, a subset of work-items in a workgroup that execute simultaneously together on a single SIMD can be referred to as a wavefront 136. The width of a wavefront is a characteristic of the hardware of the compute unit (e.g., SIMD processing core). As referred to herein, a workgroup is a collection of related work-items that execute on a single compute unit. The work-items in the group execute the same kernel and share local memory and work-group barriers.

In the exemplary embodiment, all wavefronts from a workgroup are processed on the same SIMD processing core. Instructions across a wavefront are issued one at a time, and when all work-items follow the same control flow, each work-item executes the same program. Wavefronts can also be referred to as warps, vectors, or threads.

An execution mask and work-item predication are used to enable divergent control flow within a wavefront, where each individual work-item can take a unique code path through the kernel. Partially populated wavefronts can be processed when a full set of work-items is not available at wavefront start time. For example, shader core 122 can simultaneously execute a predetermined number of wavefronts 136, each wavefront 136 comprising a multiple work-items.

Within the system 100, APD 104 includes its own memory, such as graphics memory 130 (although memory 130 is not limited to graphics only use). Graphics memory 130 provides a local memory for use during computations in APD 104. Individual compute units (not shown) within shader core 122 can have their own local data store (not shown). In one embodiment, APD 104 includes access to local graphics memory 130, as well as access to the memory 106. In another embodiment, APD 104 can include access to dynamic random access memory (DRAM) or other such memories (not shown) attached directly to the APD 104 and separately from memory 106.

In the example shown, APD 104 also includes one or "n" number of command processors (CPs) 124. CP 124 controls the processing within APD 104. CP 124 also retrieves instructions to be executed from command buffers 125 in memory 106 and coordinates the execution of those instructions on APD 104.

In one example, CPU 102 inputs instructions based on applications 111 into appropriate command buffers 125. As referred to herein, an application is the combination of the program parts that will execute on the compute units within the CPU and APD.

A plurality of command buffers 125 can be maintained with each process scheduled for execution on the APD 104.

CP 124 can be implemented in hardware, firmware, or software, or a combination thereof. In one embodiment, CP 124 is implemented as a reduced instruction set computer (RISC) engine with microcode for implementing logic including scheduling logic.

APD 104 also includes one or "n" number of dispatch controllers (DCs) 126. In the present application, the term dispatch refers to a instruction executed by a dispatch controller that uses the context state to initiate the start of the execution of a kernel for a set of work groups on a set of compute units. DC 126 includes logic to initiate workgroups in the shader core 122. In some embodiments, DC 126 can be implemented as part of CP 124.

System 100 also includes a hardware scheduler (HWS) 128 for selecting a process from a run list 150 for execution on APD 104. HWS 128 can select processes from run list 150 using round robin methodology, priority level, or based on other scheduling policies. The priority level, for example, can be dynamically determined. HWS 128 can also include functionality to manage the run list 150, for example, by adding new processes and by deleting existing processes from run-list 150. The run list management logic of HWS 128 is sometimes referred to as a run list controller (RLC).

In various embodiments of the present invention, when HWS 128 initiates the execution of a process from RLC 150, CP 124 begins retrieving and executing instructions from the corresponding command buffer 125. In some instances, CP 124 can generate one or more instructions to be executed within APD 104, which correspond with instructions received from CPU 102. In one embodiment, CP 124, together with other components, implements a prioritizing and scheduling of instructions on APD 104 in a manner that improves or maximizes the utilization of the resources of APD 104 resources and/or system 100.

APD 104 can have access to, or may include, an interrupt generator 146. Interrupt generator 146 can be configured by APD 104 to interrupt the operating system 108 when interrupt events, such as page faults, are encountered by APD 104. For example, APD 104 can rely on interrupt generation logic within IOMMU 116 to create the page fault interrupts noted above.

APD 104 can also include preemption and context switch logic 120 for preempting a process currently running within shader core 122. Context switch logic 120, for example, includes functionality to stop the process and save its current state (e.g., shader core 122 state, and CP 124 state).

As referred to herein, the term state can include an initial state, an intermediate state, and/or a final state. An initial state is a starting point for a machine to process an input data set according to a programming in order to create an output set of data. There is an intermediate state, for example, that needs to be stored at several points to enable the processing to make forward progress. This intermediate state is sometimes stored to allow a continuation of execution at a later time when interrupted by some other process. There is also final state that can be recorded as part of the output data set Preemption and context switch logic 120 can also include logic to context switch another process into the APD 104. The functionality to context switch another process into running on the APD 104 may include instantiating the process, for example, through the CP 124 and DC 126 to run on APD 104, restoring any previously saved state for that process, and starting its execution.

APD 104 can also include a time quanta configuration 134 and a process timer 132. Time quanta configuration 134 can be a register or other storage available to APD 104. Time quanta configuration 134 can also include logic to receive and store one or more time quanta values, for example, from SWS 112 or KMD 110. Furthermore, time quanta configuration 134 can also include logic to change or adapt the stored time quanta values according to system conditions that are visible to the APD. The one or more time interval values stored in time quanta configuration 134 include a maximum time interval, herein referred to as time quanta, for which a process is allowed to be running on APD 104. Threshold time quanta values can be preconfigured based on various configuration parameters. In some embodiments, the time quanta configuration 134 can be dynamically changed in response to various factors such as system environment changes, e.g., system workload. According to an embodiment, a single time quanta configuration 134 applies to all processes that run on APD 104. According to another embodiment, separate time quanta configurations can be applied to respective processes based on criteria such as a type or priority of a process.

Process timer 132 can comprise one or more timers for timing the running time of processes on APD 104. According to an embodiment, when a process is dispatched to be run on the shader core 122, a corresponding timer 132 is started by initiating it to a time interval value in process time quanta configuration 134. Process timer 132 corresponding to the process is stopped when the process completes execution on the APD, when the process is preempted for any reason such as page faults, or when the process timer 132 expires after running for the duration of the configured time interval.

Memory 106 can include non-persistent memory such as DRAM (not shown). Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102.

During execution, respective applications, operating system functions, processing logic instructions and system software can reside in memory 106. Control logic instructions fundamental to operating system 108 will generally reside in memory 106 during execution. Other software instructions, including, for example, kernel mode driver 110 and software scheduler 112 can also reside in memory 106 during execution of system 100.

In this example, memory 106 includes command buffers 125 that are used by CPU 102 to send instructions to APD 104. Memory 106 also contains process lists and process information (e.g., active list 152 and process control blocks 154). These lists, as well as the information, are used by scheduling software executing on CPU 102 to communicate scheduling information to APD 104 and/or related scheduling hardware. Memory 106 may also include a context save area 156. Access to memory 106 can be managed by a memory controller 140, which is coupled to memory 106. For example, requests from CPU 102, or from other devices, for reading from or for writing to memory 106 are managed by the memory controller 140.

Referring back to other aspects of system 100, IOMMU 116 is a multi-context memory management unit.

As used herein, context can be considered the environment within which the kernels execute and the domain in which synchronization and memory management is defined. The context can include a set of devices, the memory accessible to those devices, the corresponding memory properties and one or more command-queues used to schedule execution of a kernel(s) or operations on memory objects. On the other hand, process can be considered the execution of a program for an application that runs on a computer. The operating system can create data records and virtual memory address spaces for the program to execute. The memory and current state of the execution of the program can be called a process. The operating system may schedule tasks for the process to operate on the memory from an initial to final state.

Referring back to the example shown in FIG. 1A, IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in memory 106.

In the example shown, communication infrastructure 109 interconnects the components of system 100 as needed. Communication infrastructure 109 can include (not shown) one or more of a Peripheral Component Interconnect (PCI) bus, extended PCI (PCI-E) bus, Advanced Microcontroller Bus Architecture (AMBA) bus, Advanced Graphics Port (AGP), or other such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In this example, operating system 108 includes functionality to manage the hardware components of system 100 and to provide common services. In various embodiments, operating system 108 can execute on CPU 102 and provide common services. These common services can include, for example, scheduling applications for execution within CPU 102, fault management, interrupt service, as well as processing the input and output of other applications.

In some embodiments, based on interrupts generated by an interrupt controller, such as interrupt controller 148, operating system 108 invokes an appropriate interrupt handling routine. For example, upon detecting a page fault interrupt, operating system 108 may invoke an interrupt handler to initiate loading of the relevant page into memory 106 and to update corresponding page tables.

Operating system 108 may also include functionality to protect system 100 by ensuring that access to hardware components is mediated through operating system managed kernel functionality. In effect, operating system 108 ensures that applications, such as applications 111, run on CPU 102 in user space. Operating system 108 also ensures that applications 111 invoke kernel functionality provided by the operating system to access hardware and/or input/output functionality.

According to an embodiment of the present invention, the operating system includes an OS memory scheduler 153. OS scheduler 153 can operate to manage scheduling of processes to be executed on APD 104.

By way of example, applications 111 include various programs or instructions to perform user computations that are also executed on CPU 102. CPU 102 can seamlessly send selected instructions for processing on the APD 104.

In one example, KMD 110 implements an application program interface (API) through which CPU 102, or applications executing on CPU 102 or other logic, can invoke APD 104 functionality. For example, KMD 110 can enqueue instructions from CPU 102 to command buffers 125 from which APD 104 will subsequently retrieve the instructions. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing instructions.

In some embodiments, SWS 112 maintains an active list 152 in memory 106 of processes to be executed on APD 104. SWS 112 also selects a subset of the processes in active list 152 to be managed by HWS 128 in the hardware. Information relevant for running each process on APD 104 is communicated from CPU 102 to APD 104 through process control blocks (PCB) 154.

Processing logic for applications, operating system, and system software can include commands and/or other instructions specified in a programming language such as C and/or in a hardware description language such as Verilog, RTL, or netlists, to enable ultimately configuring a manufacturing process through the generation of maskworks/photomasks to generate a hardware device embodying aspects of the invention described herein.

A person of skill in the art will understand, upon reading this description, that computing system 100 can include more or fewer components than shown in FIG. 1A. For example, computing system 100 can include one or more input interfaces, non-volatile storage, one or more output interfaces, network interfaces, and one or more displays or display interfaces.

Figure 1B:
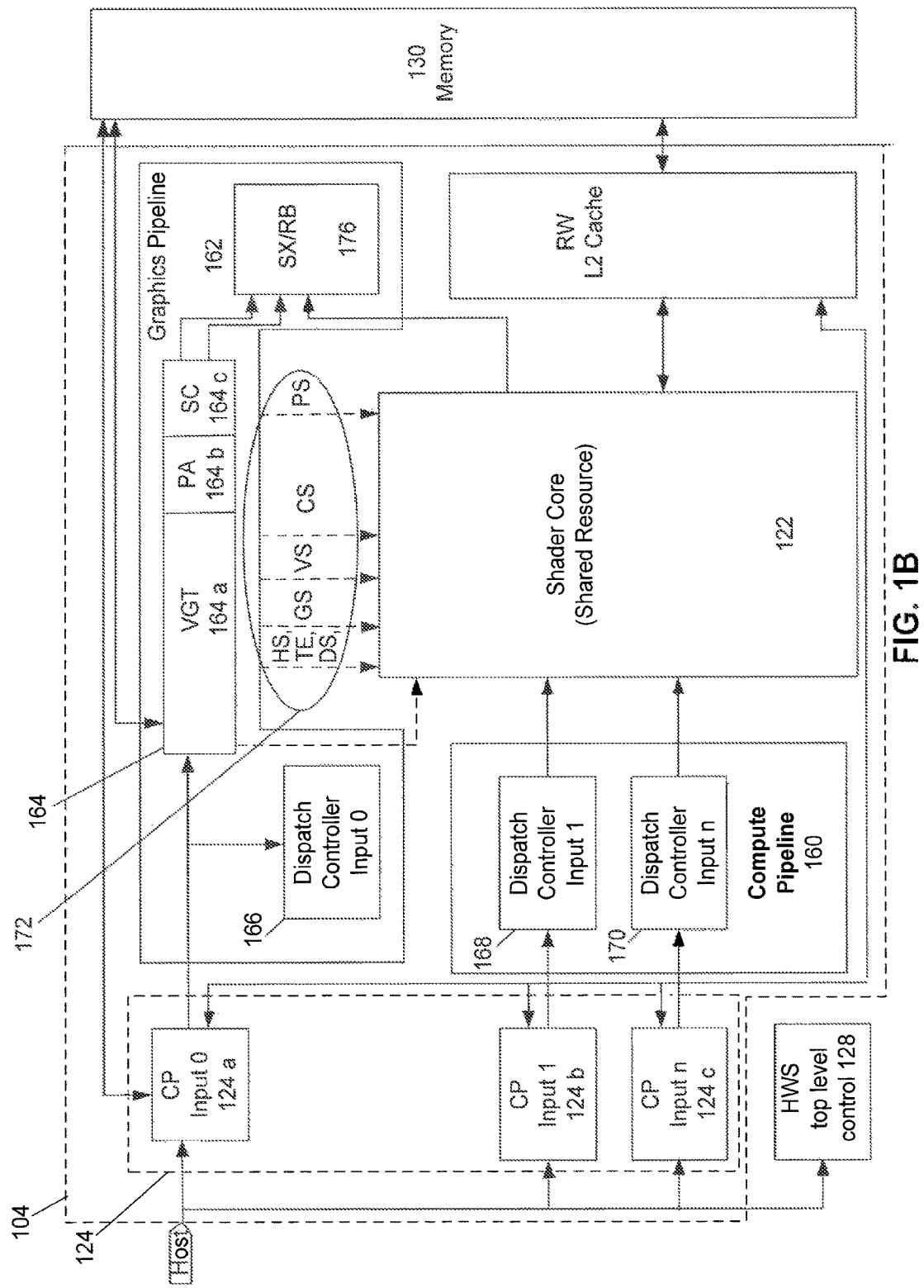
FIG. 1B is an illustrative block diagram illustration of the APD illustrated in FIG. 1A.

FIG. 1B is an embodiment showing a more detailed illustration of APD 104 shown in FIG. 1A. In FIG. 1B, CP 124 can include CP pipelines 124a, 124b, and 124c. CP 124 can be configured to process the command lists that are provided as inputs from command buffers 125, shown in FIG. 1A. In the exemplary operation of FIG. 1B, CP input 0 (124a) is responsible for driving instructions into a graphics pipeline 162. CP inputs 1 and 2 (124b and 124c) forward instructions to a compute pipeline 160. Also provided is a controller mechanism 166 for controlling operation of HWS 128.

In FIG. 1B, graphics pipeline 162 can include a set of blocks, referred to herein as ordered pipeline 164. As an example, ordered pipeline 164 includes a vertex group translator (VGT) 164a, a primitive assembler (PA) 164b, a scan converter (SC) 164c, and a shader-export, render-back unit (SX/RB) 176. Each block within ordered pipeline 164 may represent a different stage of graphics processing within graphics pipeline 162. Ordered pipeline 164 can be a fixed function hardware pipeline. Other implementations can be used that would also be within the spirit and scope of the present invention can be used.

Although only a small amount of data may be provided as an input to graphics pipeline 162, this data will be amplified by the time it is provided as an output from graphics pipeline 162. Graphics pipeline 162 also includes DC 166 for counting through ranges within work-item groups received from CP pipeline 124a. Compute work submitted through DC 166 is semi-synchronous with graphics pipeline 162.

Compute pipeline 160 includes shader DCs 168 and 170. Each of the DCs 168 and 170 is configured to count through compute ranges within work groups received from CP pipelines 124b and 124c.

The DCs 166, 168, and 170, illustrated in FIG. 1B, receive the input ranges, break the ranges down into workgroups, and then forward the workgroups to shader core 122.

Since graphics pipeline 162 is generally a fixed function pipeline, it is difficult to save and restore its state, and as a result, the graphics pipeline 162 is difficult to context switch. Therefore, in most cases context switching, as discussed herein, does not pertain to context switching among graphics processes. An exception is for graphics work in shader core 122, which can be context switched.

After the processing of work within graphics pipeline 162 has been completed, the completed work is processed through a render back unit 176, which does depth and color calculations, and then writes its final results to memory 130.

Shader core 122 can be shared by graphics pipeline 162 and compute pipeline 160. Shader core 122 can be a general processor configured to run wavefronts.

In one example, all work within compute pipeline 160 is processed within shader core 122. Shader core 122 runs programmable software code and includes various forms of data, such as state data.

A disruption in the QoS occurs when all work-items are unable to access APD resources. Embodiments of the present invention efficiently and simultaneously launch two or more tasks within an accelerated processing device 104, enabling all work-items to access to APD resources. In one embodiment, an APD input scheme enables all work-items to have access to the APD's resources in parallel by managing the APD's workload. When the APD's workload approaches maximum levels, (e.g., during attainment of maximum I/O rates), this APD input scheme ensures that otherwise unused processing resources can be simultaneously utilized. A serial input stream, for example, can be abstracted to appear as parallel simultaneous inputs to the APD.

By way of example, each of the CPs 124 can have one or more tasks to submit as inputs to the APD 104, with each task can representing multiple wavefronts. After a first task is submitted as an input, this task may be allowed to ramp up, over a period of time, to utilize all the APD resources necessary for completion of the task. By itself, this first task may or may not reach a predetermined maximum APD utilization threshold. However, as other tasks are enqueued and are waiting to be processed within the APD 104, allocation of the APD resources can be managed to ensure that all of the tasks can simultaneously use the APD 104, each achieving a percentage of the APD's maximum utilization. This simultaneous use of the APD 104 by multiple tasks, and their combined utilization percentages, ensures that a predetermined maximum APD utilization threshold is achieved.

Figure 2:
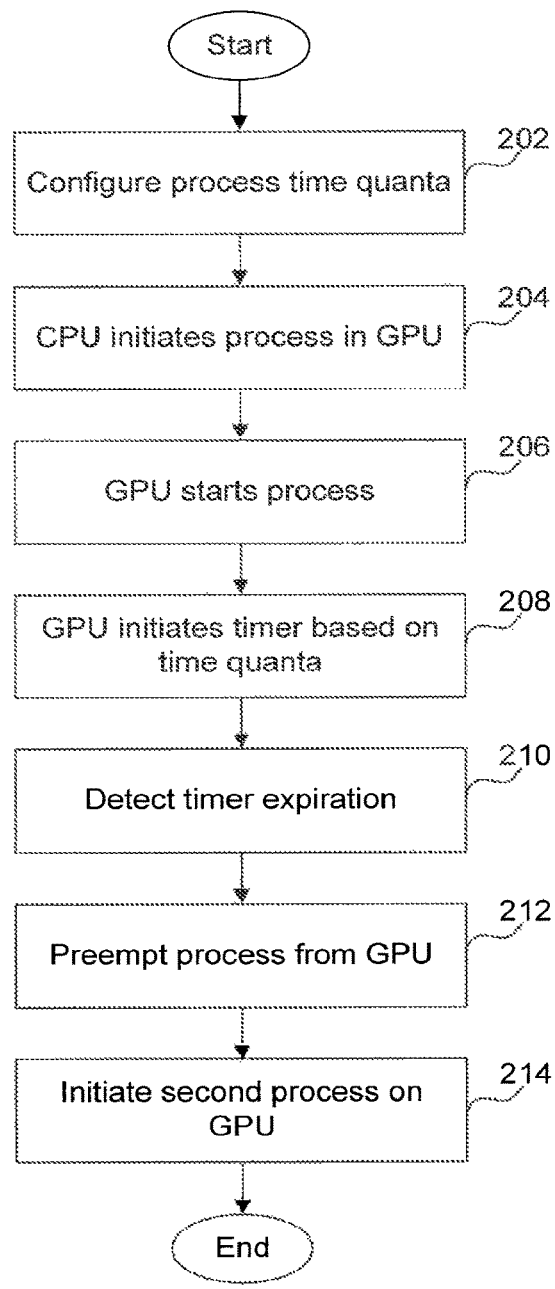
FIG. 2 is a flowchart illustrating a method for APD context switching based on time quanta, according to an embodiment of the present invention.

FIG. 2 illustrates a flowchart of a method 200 for preemptive APD context switching based on time quanta, according to an embodiment of the present invention. For example, method 200 may run on system 100 shown in FIGS. 1A and 1B. With method 200, an APD can detect an expiration of a maximum time interval for which a process can run at a time on the APD, and is able to initiate and implement a preemptive context switch based upon the expiration of the time interval. Method 200 may not occur in the order shown, or require all of the steps.

In step 202, a time quanta, or more particularly, a maximum time interval during which any particular process can be running on the APD, is configured. The time quanta can be configured as a single value which applies to any process that runs on the APD, or as a plurality of values comprising respective values for each type or priority level of processes that run on the APD. The configuration can be received from the user or may be otherwise set. In another embodiment, the time quanta can be determined by an OS or other application based on system considerations, such as, but not limited to, the current or predicted system workload. The configuration of the time quanta value can be performed by, or using, an application executing on a CPU.

In step 204, the CPU enqueues a process to be executed on the APD. More specifically, the CPU transmits one or more instructions to be executed on the APD. With respect to FIG. 1A, the enqueuing of the process can include, for example, CPU 102 adding entries corresponding to the one or more transmitted instructions to active list 152 and process control blocks 154, as well as inputting the instructions to the corresponding command buffer 125. According to an embodiment, when the CPU enqueues the process to the APD, the CPU can also transmit to the APD the corresponding time quanta configuration. According to another embodiment, the time quanta configuration is common to multiple processes that execute on the APD and is therefore unnecessary for the CPU to transmit the corresponding time quanta to the APD along with information of the process to be run. The transmitting of the process information from the CPU to the APD is further described below in relation to FIG. 3.

In step 206, the APD starts running the process enqueued by the CPU. According to an example, with respect to FIG. 1A, the running of the process on APD 104 may involve, the process being selected to run from the RLC 150, the CP 124 retrieving instructions of the selected process from the corresponding command buffers 125, the dispatch controller 126 dispatching the retrieved instructions to the appropriate processing pipeline of the APD 104 (e.g., compute pipeline 160, graphics pipeline 162), and the running of the process on shader core 122 as a thread or wavefront 136. Graphics processing utilizes the graphics pipeline 162 of APD 104, and the compute processes utilize the compute pipeline 160. Both types of processes utilize shader core 122 of the APD for processing operations. The running of a process on the APO is farther described below in relation to FIG. 4.

In step 208, a timer corresponding to the selected APD process is started. According to an embodiment, substantially concurrently with starting to run the selected process on the APD (as described in relation to step 206 above), a corresponding process timer is initiated. The process timer, for example, process timer 132 in FIG. 1A, is set to a maximum time interval that the selected process is allowed to run without preemption. The time interval is set to a time quanta threshold value that may have been preconfigured or dynamically determined.

According to an embodiment, the time quanta value is configured by the user or at the time of manufacture. According to another embodiment, the time quanta value is dynamically determined based upon the current system workload. For example, the system can select from among several threshold time quanta values based upon past workload or an estimation of the current and/or future workload of the system as a whole, or of the APD.

The setting for the maximum running time for the process, such as process timer 132 in FIG. 1A, may be determined based on one or more available configured time quanta values. According to another embodiment, the time quanta applied to each process can be determined based on a characteristic of the process such as its type or priority. According to yet another embodiment, a single time quanta value is applied to any process running on the APD.

In step 210, an expiration of the timer associated with the process currently running on the APD (i.e., the process started to run as described in step 206 above) is detected. For example, with respect to FIG. 1A, the expiration of process timer 132 that was started substantially at the same time process 136 was started on shader core 122 is detected. The expiration of the timer can be detected, for example, when the timer reaches a value of 0 (i.e., counting down from the value set according to the corresponding time quanta). According to an embodiment, with respect to FIG. 1A, the expiration of the timer can be notified to the CP 124 or other part of APD 104 by a message. According to an embodiment, the communication may be based upon an interrupt that may be directly or indirectly trapped by the APD. In another embodiment, the interrupt can be trapped by the operating system, such as operating system 106. In another embodiment, the interrupt is detected by APD 104 or a hardware-based scheduler such as HWS 128 or preemption and context switch logic 120.

In step 212, based upon the process timer expiry detected in step 210, preemption of the currently running process is initiated. Preemption can, for example, with respect to FIG.

1A, be initiated by SWS 112 upon being invoked by an interrupt service routine servicing the interrupt generated due to the timer expiration. In one embodiment, SWS 112 is invoked by APD 104. In another embodiment, SWS 112 is invoked by OS 108. In yet another embodiment, APD 104 (e.g., using HWS 128 or preemption and context switch logic 120) can detect the expiration of the timer and initiate the preemption of the current process. Preemption of the current process is further described in relation to FIG. 5 below.

In step 214, another process is context switched into running on the APD in place of the preempted process. The newly context switched process can be selected from the run list, and can be started to run within its own interval defined by a time quanta. According to an embodiment, a software-based scheduler, such as SWS 112, initiates the context switch of the new process. According to another example, a hardware-based scheduler, such as HWS 128 or preemption and context-switch logic 120, can initiate the context switch of the new process. Initiating the context switch may involve selecting a new process and starting to run the selected new process on APD 104, as described below in relation to FIG. 4.

Figure 3:
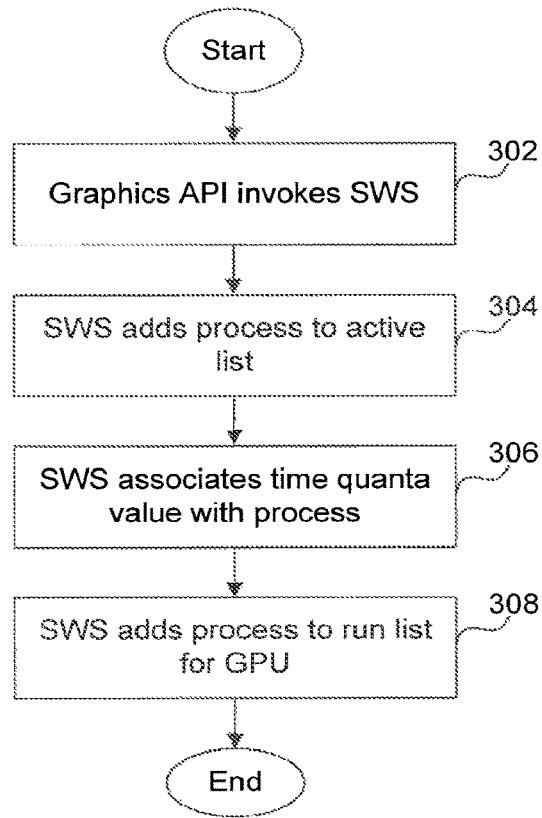
FIG. 3 is a flowchart illustrating a method for scheduling a process to be run on the APD, according to an embodiment of the present invention.

FIG. 3, is a flowchart illustrating a method 204 for scheduling a process to be run on the APD, according to an embodiment of the present invention. For example, method 204 may run on system 100 in FIGS. 1A and 1B. According to an embodiment, steps 302-308 may be used in performing the functionality of step 204 discussed above. Method 204 may not occur in the order shown, or require all of the steps.

Step 302 can be performed upon, for example, an application executing on CPU 102 transmitting one or more instructions to be processed on APD 104. In step 302, according to an embodiment, the application calls KMD 110. KMD 110 includes logic to analyze the instruction input by the application and invokes SWS 112 if a process needs to be scheduled to be run on APD 104 to process the input instruction. For example, KMD 110 can determine if the input instruction relates to a process already scheduled for execution on APD 104, or if it relates to a instruction for which no process is currently scheduled. Already scheduled processes may have corresponding entries in the active list 152 and/or RLC 150. If the corresponding process is already scheduled for execution on the APD, the input instruction is enqueued to the appropriate command ring 125. If the corresponding process if not already scheduled, then KMD 110 may invoke SWS 112 to schedule the process. SWS 112 can be implemented as part of KMD 110 or separately. According to another embodiment, the application can call a function other than KMD 110 to enqueue instructions to APD 10.

In step 304, the process to be scheduled is added to a list of processes to be executed by the APD. According to an embodiment, SWS 112 adds the process to active list 152. As described above, active list 152 may be a list of entries corresponding to respective processes to be run on APD 104 enqueued by a scheduler, such as SWS 112. Adding a process to active list 152 may also include adding process information to list of process control blocks 154. The entries corresponding to the process in active list 152 and process control block 154 may also include a pointer to one or more command buffers 125 that hold, or that are intended to hold, commands and other instructions associated with the process.

In step 306, a time quanta value is associated with the process to be run on the APD. According to an embodiment, SWS 112 may associate a time quanta value selected from among one or more threshold values. The time quanta value may be based upon characteristics of the process, such as process priority. The time quanta value can, for example, be associated with the entry in the process control blocks 154 that corresponds to the process.

In step 308, the process to be scheduled is sent to the APD. According to an embodiment, SWS 112 adds the process to a run list managed by the APD 104. According to an example, SWS 112 selects one or more entries from active list 152 to be added to RLC 150. As described above, APD 104 subsequently selects processes to be run from RLC 150.

Figure 4:
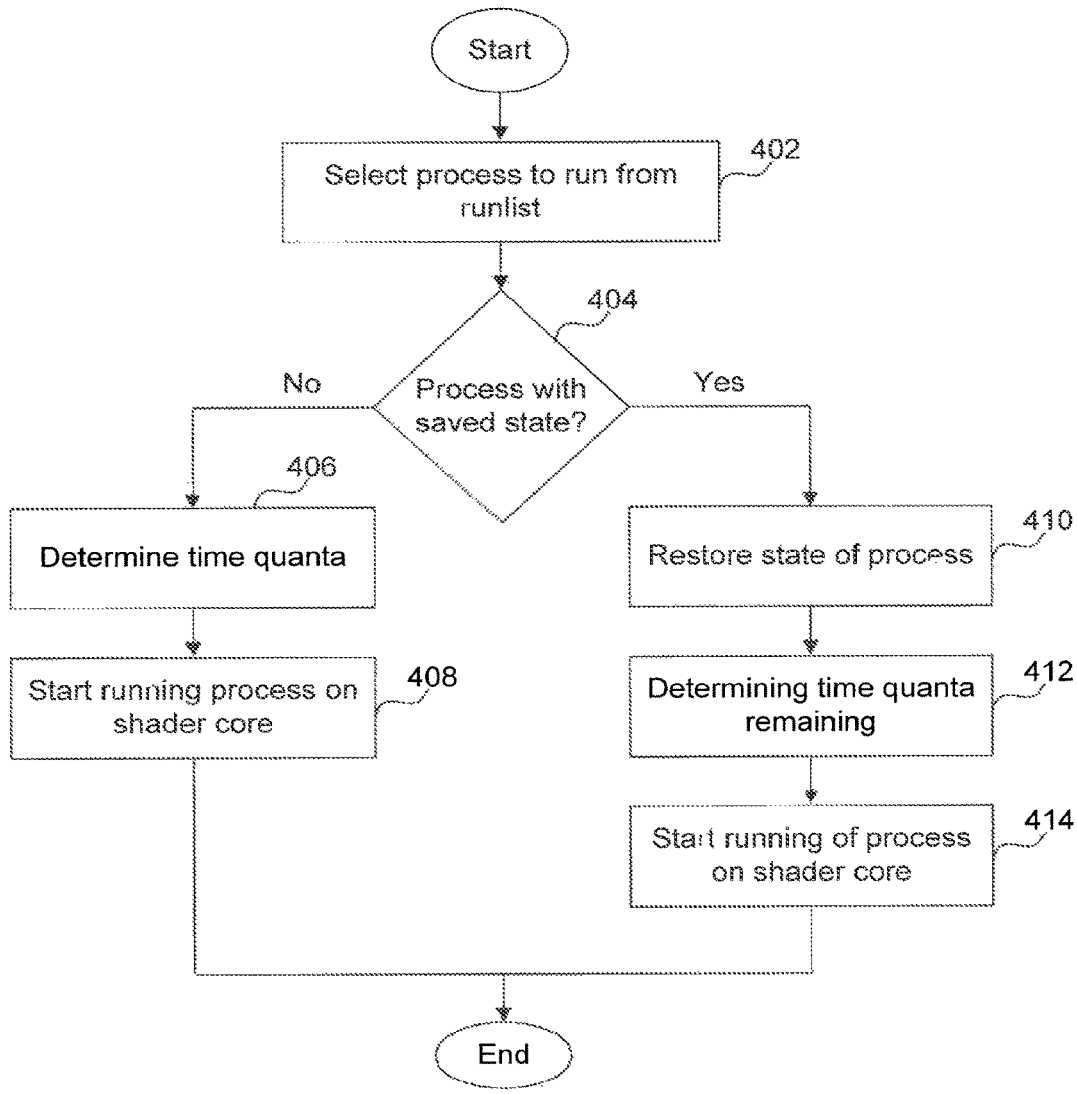
FIG. 4 is a flowchart illustrating a method for selecting and initiating the running of a process on the APD, according to an embodiment of the present invention.

FIG. 4 illustrates a flowchart of a method 206 that initiates running of a process on a APD, according to an embodiment of the present invention. For example, method 206 may run on system 100 in FIG. 1. According to an embodiment, steps 402-414 can be performed in order to implement at least some of the functionality of step 206 described above. Method 206 may not occur in the order shown, or require all of the steps. Merely for illustrative purposes, without limitation, method 206 will be described in relation to system 100.

Step 402 can be performed, for example, when a APD selects a process to be run next. For example, step 402 can be performed when APD 104, or specifically a scheduler (e.g., SWS 112, HWS 128, or preemption and context switch logic 120) associated with APD 104, selects a process from RLC 150, to be run on shader core 122. According to an embodiment, SWS 112 selects a process from RLC 150 and notifies CP 124 to run the selected process. According to another embodiment, a hardware-based scheduler, such as HWS 128 or preemption and context switch logic 120, selects the next process to be run from RLC 150. CP 124 and dispatch controller 126 dispatches instructions from command buffers 125 that correspond to the selected process to be executed.

In step 404, it is determined whether the selected process has a saved state. For example, CP 124 may determine if the selected process has a saved state in memory 106 from a previous run on shader core 122. The selected process may have previously been running on shader core 122 and may have been preempted and its state saved. The address in memory 106 at which the state is saved may be obtained from the corresponding entry in list of process control blocks 154.

If the selected process has a saved state, as determined in step 404, then in step 410 the saved state is restored. Restoring of the saved state may involve the retrieving the state information from system memory 106 and configuring the relevant registers and the like with the state of the selected process. Restoring of the saved state can include restoring the program counter, constant values, variable values, and the like. Restoring the state can involve restoring wavefront state (e.g., state common to all threads of a wavefront) such as program counter, and state of individual threads (e.g., variables, data). In general, graphics processes or processes that occupy the graphics pipeline can have a larger amount of state than a process occupying the compute pipeline.

In step 412, the time quanta to be configured for the current run of the process are determined. For example, the value of the time quanta with which time quanta configuration 134 is set to and from which timer 132 is initiated is determined in step 412. In one example, the time quanta value used is the threshold time quanta that is preconfigured for use with all processes or a group of one or more processes to which the selected process belongs. This, for example, is the case when the selected process has previously run for its full time quanta and was preempted. In another example, if the selected process was preempted in its previous run prior to the expiration of the time quanta, then the new time quanta value can be configured as the time remaining when the previously used up time is subtracted from the full time quanta value. The determined value is configured in time quanta configuration 134.

In step 414, the selected process is run on the shader core using the restored state. For example, CP 124 can start running of the selected process on the shader core 122. As described in relation to step 208 of FIG. 2, a timer 132 can be started substantially at the same time that the selected process begins to run. Timer 132 may expire when the configured time quanta is exceeded and the selected process has not yet completed running or has not otherwise been preempted from running on the APD 104.

If, in step 404, it is determined that the selected process has no previously stored state, then processing proceeds to step 406. In step 406, the value of the time quanta to be associated with the running time of the selected process is determined. The time quanta can be based upon a threshold value, or, as described above, can be determined based on the system environment. In an example, the SWS 112 can configure a time quanta for the selected process, which is then used by CP 124 to configure time quanta configuration 124.

Subsequent to configuring the time quanta in, for example, time quanta configuration 134, the selected process is run on shader core 122 in step 408. For example, CP 124 can start running of the selected process on the shader core 122.

Figure 5:
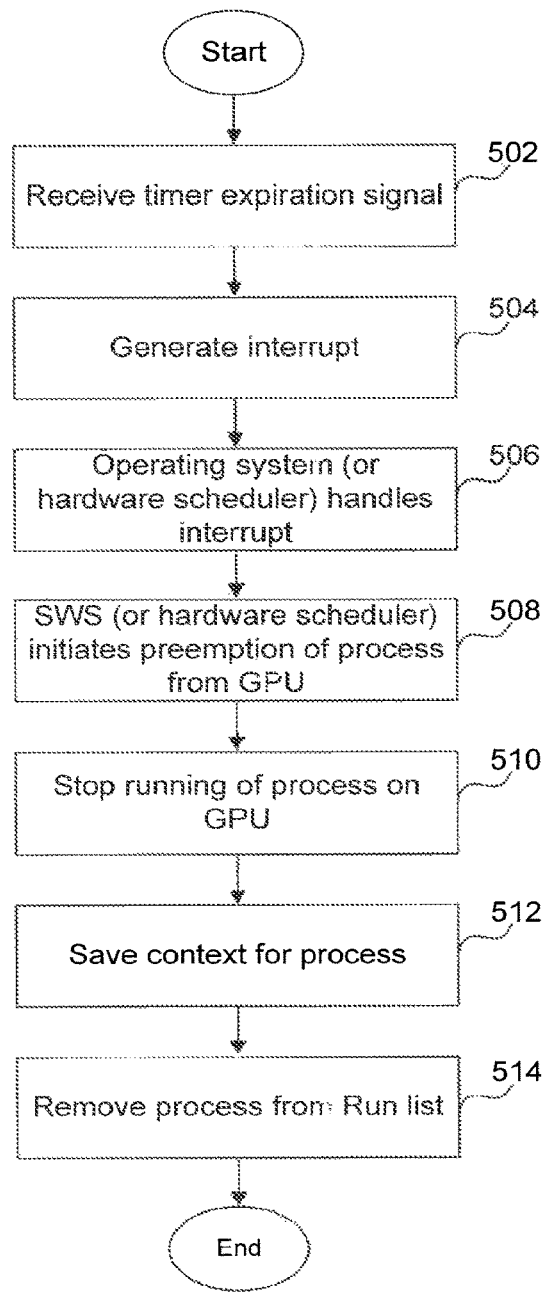
FIG. 5 is a flowchart illustrating a method for determining if an APD should be context switched, according to an embodiment of the present invention.

FIG. 5 illustrates a flowchart of a method 212 that preempts running process on an APD according to an embodiment of the present invention. For example, method 212 may run on system 100 in FIGS. 1A and 1B. According to an embodiment, steps 502-514 can be performed in order to implement functionality of step 212 described above in relation to FIG. 2 to preempt the process currently running on the APD. The method 212 may not occur in the order shown, or require all of the steps. Merely for illustrative purposes, without limitation, method 206 will be described in relation to system 100.

In step 502, an interrupt generation mechanism detects the expiration of a timer. For example, interrupt generator 146 may detect the expiration of timer 132 when a process 136 has been running on shader core 122 for a time interval corresponding to time quanta configuration 134.

In step 504, the interrupt generator generates an interrupt indicating the expiration of the timer 132. As described above, interrupt generator 146 can be implemented as part of APD 104, as part of IOMMU 116, or separately.

In step 506, an interrupt handler in the OS 108 receives the interrupt. For example, interrupt controller 148 can trap the interrupt generated by the APD-associated interrupt generator 146. Interrupt controller 148 may identify the interrupt as one due to time quanta expiration on the APD and would invoke an interrupt handling routine to handle the interrupt.

In step 508, the OS initiates the preemption of the process currently running on the APD. According to an embodiment, OS 108 or OS scheduler 153 can invoke SWS 112 to initiate the preemption process. As described above, SWS 112 can be implemented as part of KMD 110 or as a separate module.

In step 510, SWS 112 transmits an instruction to the APD 104 to stop the current process. CP 124, upon receiving the instruction to stop the current process, can stop further dispatch of instruction for the process currently executing on the APD and then stop the execution of the process. According to an embodiment, there may be a time interval that the CP 124 waits for after the stop instruction before proceeding to the next steps.

In step 512, the context for the current process (i.e., process stopped in step 510) is saved. Saving of the context can involve saving state that is common to a wavefront and also the state local to individual threads of that wavefront. The amount of state to be saved may differ between compute processes that occupy the compute pipeline and graphics processes that occupy the graphics pipeline.

Saving context may involve saving either or both, the wavefront state of the process and the individual thread state of the process, out to system memory. According to one embodiment, the preemption of a compute process involves saving the wavefront state and thread state of the current compute process executing on shader core 122 to a context save area 156 in system memory 106. Context saving for a graphics process may involve only the wavefront state (i.e., state common to all threads) being saved to the context save area 156 in system memory 106. Graphics processes, for example, can have very large amounts of thread-level state which can be time-consuming to save to system memory. The address in memory 106 at which the context is to be saved can be provided by the OS 108 or can be determined at runtime and can be recorded with process information in PCB 154.

In step 514, SWS 112 transmits an instruction to remove the current process from the sun list. For example, SWS 112 may monitor the context save completion of the current process, and upon determining that the context save is over, transmit a instruction to remove the process from the RLC 150.

Having completed the preemption of the current process from executing of the APD, SWS 112 can proceed to context switch a new process to execute on the APD, as described in relation to step 214 of FIG. 2.

CONCLUSION

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for use in an accelerated processing device (APD) running a process, the method comprising:
   the APD detecting a timer expiration indicating that a running time of the process is equal to or greater than a threshold time quanta;
   the APD generating an interrupt corresponding to the timer expiration;
   receiving, by the APD, an instruction from the operating system to stop running the process based on the generated interrupt; and
   stopping, by the APD, the process from running in response to the instruction received from the operating system.

2. The method of claim 1, further comprising:
   receiving a setting of a value for the threshold time quanta from at least one of a user interface, a central processing unit (CPU), and the operating system;
   setting the timer based on the received setting;
   starting the timer and starting the running of the process concurrently; and
   detecting the expiration of the threshold time quanta when the timer expires.

3. The method of claim 1, wherein the threshold time quanta is only applicable to the process running on the APD, is applicable to all processes that run on the APD, or is applicable to a particular group of process that run on the APD.

4. The method of claim 1, wherein the threshold time quanta is dynamically configurable based on an actual workload, a predicted workload, or a characteristic of the process running on the APD.

5. The method of claim 1, wherein the threshold time quanta is pre-configured in the APD.

6. The method of claim 1, wherein the stopping the process from running includes stopping further dispatch of instructions for the process and stopping the execution of the process.

7. The method of claim 1, further comprising saving at least one of a wavefront state of the process and an individual thread state of the process to a memory when the APD stops the process from running in response to the instruction received from the operating system.

8. The method of claim 1, wherein the running the process comprises running a process selected from a runlist managed by the APD, the process being enqueued on the runlist in response to signaling from a CPU.

9. The method of claim 8, wherein the method further comprises:
   determining if the process selected has a saved state from a previous run on the APD;
   when it is determined that the process selected has a saved state, restoring the saved state of the process selected by retrieving the saved state from memory, configuring registers with the state of the process selected, and running the process selected using the restored state; and
   when it is determined that the process selected has no saved state, running the process selected without restoring a saved state of the process selected.

10. An accelerated processing device (APD) comprising:
    a shader core; and
    at least one command processor configured to:
    run a process on the shader core,
    detect a timer expiration indicating that a running time of the process is equal to or greater than a threshold time quanta,
    generate an interrupt corresponding to the timer expiration,
    receive, from an operating system, an instruction to stop running the process based on the generated interrupt, and
    stop running the process in response to the instruction received from the operating system.

11. The APD of claim 10, further comprising an interrupt handler configured to detect the expiration of the threshold time quanta and generate an interrupt in response to detecting the expiration of the threshold time quanta.

12. The APD of claim 10, further comprising:
    a time quanta configuration, the time quanta configuration providing a time quanta value for the threshold time quanta; and
    a timer configured to run based on the time quanta value provided by the time quanta configuration.

13. The APD of claim 12, wherein the time quanta configuration includes at least one of a memory on which a pre-set time quanta value for use with all processes or a specific group of processes that run on the shader core is stored, logic to receive and store one or more time quanta values from one of a user interface, another processor or the operating system, or logic to adapt one or more stored time quanta values according to system conditions that are visible to the APD.

14. The APD of claim 10, wherein the at least one command processor is further configured to stop the process from running by stopping further dispatch of instructions for the process and stopping the execution of the process.

15. The APD of claim 10, wherein the at least one command processor is further configured to run the process by running a process selected from a runlist managed by the APD, the process being enqueued on the runlist in response to signaling from a central processing unit (CPU).

16. A non-transitory computer readable medium storing instructions, which, if executed, cause execution of a method comprising:
    running a process on an accelerated processing device (APD);
    the APD detecting a timer expiration indicating that a running time of the process is equal to or greater than a threshold time quanta;
    the APD generating an interrupt corresponding to the timer expiration;
    receiving, at the APD, an instruction from the operating system to stop running the process based on the generated interrupt; and
    stopping, at the APD, the process from running in response to the instruction received from the operating system.

17. The non-transitory computer readable medium of claim 16, wherein the threshold time quanta is one of dynamically configurable based on an actual workload, a predicted workload, or a characteristic of the process running on the APD and pre-configured in the APD.

* * * * *